(12) United States Patent
Haase et al.

(10) Patent No.: US 11,801,772 B2
(45) Date of Patent: Oct. 31, 2023

(54) THERMAL MANAGEMENT MODULE AND OPERATING METHOD

(71) Applicant: MAHLE International GmbH, Stuttgart (DE)

(72) Inventors: Kristian Haase, Leinfelden-Echterdingen (DE); Holger Ulrich, Korntal-Muenchingen (DE)

(73) Assignee: Mahle International GmbH, Stuttgart (DE)

( * ) Notice: Subject to any disclaimer, the term of this patent is extended or adjusted under 35 U.S.C. 154(b) by 0 days.

(21) Appl. No.: 17/705,312

(22) Filed: Mar. 26, 2022

(65) Prior Publication Data

US 2022/0305954 A1   Sep. 29, 2022

(30) Foreign Application Priority Data

Mar. 26, 2021   (DE) ...................... 10 2021 203 032.7

(51) Int. Cl.
  *B60L 58/26*   (2019.01)
  *B60K 11/02*   (2006.01)
  (Continued)

(52) U.S. Cl.
  CPC .............. *B60L 58/26* (2019.02); *B60K 11/02* (2013.01); *B60R 16/0231* (2013.01); *B60R 16/033* (2013.01)

(58) Field of Classification Search
  None
  See application file for complete search history.

(56) References Cited

U.S. PATENT DOCUMENTS

| 2003/0137193 A1* | 7/2003 | Belschner ............... B60L 58/30 307/9.1 |
| 2008/0047688 A1 | 2/2008 | Ebigt et al. |

(Continued)

FOREIGN PATENT DOCUMENTS

| DE | 102006040187 A1 | 3/2008 |
| DE | 102014008690 A1 | 12/2015 |

(Continued)

OTHER PUBLICATIONS

U.S. Appl. No. 17/705,314, filed Mar. 26, 2022, Kristian Haase.

*Primary Examiner* — Jared Fureman
*Assistant Examiner* — Joel Barnett
(74) *Attorney, Agent, or Firm* — Ewers IP Law PLLC; Falk Ewers

(57) ABSTRACT

A thermal management module includes a component carrier, at least two, typically multiple electrically controllable function components for temperature-controlling at least one vehicle component of a motor vehicle, which are detachably or non-detachably connected to the component carrier, at least one electrical control unit, which for electrically controlling at least two, typically multiple, particularly typically all of the function components include a control electronic system, which via at least one electrical control line path and/or via a component field bus is electrically connected to the respective function component and arranged in a housing of the control unit, wherein the housing of the control unit is detachably or non-detachably fastened to the component carrier and/or to at least one of the function components.

17 Claims, 3 Drawing Sheets

(51) Int. Cl.
*B60R 16/033* (2006.01)
*B60R 16/023* (2006.01)

(56) References Cited

U.S. PATENT DOCUMENTS

| | | | |
|---|---|---|---|
| 2018/0126861 A1* | 5/2018 | Dörndorfer | B60L 53/34 |
| 2020/0067728 A1* | 2/2020 | Sonnek | H04L 12/46 |
| 2020/0259228 A1* | 8/2020 | Eser | H01M 10/613 |
| 2021/0080201 A1* | 3/2021 | Mayer | F28F 27/02 |
| 2021/0392077 A1 | 12/2021 | Laengst et al. | |
| 2022/0140420 A1* | 5/2022 | Kim | H01M 10/625 62/190 |

FOREIGN PATENT DOCUMENTS

| | | |
|---|---|---|
| DE | 102015203028 A1 | 8/2016 |
| DE | 102018131134 A1 | 6/2020 |
| DE | 102019201607 A1 | 8/2020 |

* cited by examiner

THERMAL MANAGEMENT MODULE AND OPERATING METHOD

CROSS REFERENCE TO RELATED APPLICATIONS

This application claims priority to German patent application DE 10 2021 203 032.7, filed Mar. 26, 2021, the entire content of which is incorporated herein by reference.

TECHNICAL FIELD

The disclosure relates to a thermal management module for temperature-controlling a motor vehicle, and to a motor vehicle including such a thermal management module. Further, the disclosure relates to a method for operating such a thermal management module.

BACKGROUND

So-called thermal management modules mean devices which serve for transporting heat in a vehicle, in particular with electric energy store and electric drive motor. In these thermal management modules, a multiplicity of so-called function components such as for example electric pumps and electrically controllable valves are typically arranged. In addition to this, a multiplicity of sensors, in particular pressure and temperature sensors are typically installed in such a module, which generate sensor data.

There, the electrical wiring of the function components proves to be problematic since typically elaborate and thus involves a great deal of expense. In an extreme case, separate voltage supply and control lines may be necessary for each of the said function components. In the light of the installation space that is only conditionally available especially in motor vehicles, this does not only mean a high material expenditure, but also installation expenditure when the thermal management module is to be installed in the vehicle. Here it proves to be particularly problematic when errors in the electrical wiring of the function components are detected only after the completion of the installation since correcting such errors turns out to be particularly complicated and thus expensive.

SUMMARY

It is therefore an object of the present disclosure to create an improved or at least alternative embodiment for a thermal management module, in which the problems explained above are taken into account. In particular, a thermal management module with particularly simple electrical wiring is to be created, so that both the installation expenditure and also the budget for producing such a thermal management module are reduced.

According to the disclosure, this object is achieved by a thermal management module for a temperature-control circuit of a motor vehicle, a motor vehicle, and a method for operating a thermal management module as described herein.

Accordingly, a basic idea of the disclosure is to realize the electrical wiring and connected to this also the electrical control of the thermal management module explained above in a modular manner. To this end it is provided to realize the electrical wiring, in particular the electrical connection of the individual function components of the module to an electric voltage supply of a motor vehicle and to a field bus— in particular to a CAN bus— of the motor vehicle via a common electrical control unit with control electronic system.

This means that the electric control and also the electric voltage supply of all function components included in the thermal management module can take place via this control unit. Such a control unit according to the disclosure is equipped with a control electronic system comprising electronic and/or electrical elements which can be connected to the field bus of the motor vehicle using the thermal management module—in the following referred to as "vehicle field bus"—; there, the control unit is connected in a data-transmitting manner to one, to two or to multiple of the function components via a so-called component field bus— in particular via a LIN bus. Thus, the control of the function components can take place substantially independently by way of the control unit. The control of the control unit in turn can take place via the vehicle field bus connected to the control unit.

Thus, higher-level control commands can be sent to the control unit via the vehicle field bus, which can be assigned to a specific function module of the thermal management module. The individual control of the function components required for implementing the respective operating state can be taken over by the control electronic system of the control unit without a communication with the vehicle field bus being required for this purpose.

Alternatively, to the control of the function components via the component field bus it is also conceivable that the control electronic system provides electrical control lines— in the following also referred to as "control line paths"— with which the control unit or its control electronic system can be electrically connected to the respective function component. On the one hand, this can be electrical control lines via which control signals can be transmitted from the control unit to the respective component carrier, for example a valve or a pump. On the other hand, these control lines can also be signal and/or sensor lines, via which information is transmitted from the respective function component—for example a temperature sensor or a pressure sensor—to the control unit.

The control unit proper can be equipped with electrical connections, which in turn can include suitable plug connections, which on the input side are electrically connected to the motor vehicle and on the output side electrically connected to the function components.

The electrical wiring via the common control unit proposed for this purpose according to the disclosure brings about that short electrical cable distances can be realized. Thus, compared with conventional solutions, a substantial amount of installation space and material can be saved. The installation of the module with the function components and the control unit also proves to be significantly simpler with the module according to the disclosure as would be the case when each function component would have to be individually connected to the electric voltage supply or the vehicle field bus of the motor vehicle.

The thermal management module according to the disclosure introduced here includes a component carrier and at least two, preferentially multiple electrically controllable function components for temperature-controlling at least one vehicle component of a motor vehicle, wherein the function components are detachably or permanently connected to the component carrier. Further, the module includes at least one electrical control unit which for electrically controlling at least two, typically multiple, particularly typically all of the function components, comprising a control electronic system with electrical and electronic elements or components.

According to the disclosure, the control electronic system is electrically connected to the respective function component via at least one electrical control line path and/or via a component field bus. Apart from this, the control electronic system is arranged in a housing of the control unit. The housing of the control unit in turn is detachably or permanently fastened to the component carrier and/or to the at least one of the function components. Here, a component interface for the respective function component can be molded onto the component carrier and the respective function component detachably fastened to the component carrier via the component interface.

According to an advantageous further development, the module can comprise at least one function component of a cooling circuit of the vehicle that can be flowed through by a cooling liquid. The cooling liquid can be a coolant and/or refrigerant. Here, the at least one function component realizes a substantial or indispensable fluidic function in the cooling circuit such as for example a cooling or a collecting or a condensing of the cooling liquid. By contrast, the component carrier is typically not assigned a substantial or indispensable fluidic function in the cooling circuit of the vehicle. Because of this, the component carrier is of a sturdy and trouble-free design. The at least one function component can additionally be replaced independently of further function components and of the component carrier if required. Altogether, a space-saving, sturdy and cost-effective solution is provided by the component node according to the disclosure.

Advantageously, the module can comprise multiple function components which can be incorporated in the cooling circuit of the motor vehicle and can be flowed through by cooling liquid. Here, a component interface, via which the respective function component is detachably fastened to the component carrier can be formed on the component carrier for each function component. Advantageously, the component interface can be adapted for receiving the at least one function component.

According to an exemplary embodiment, the detachable fastening of the housing is realized with at least one screw connection and/or clip connection and/or snap-on connection. Alternatively or additionally, to this, the permanent fastening of the housing can be realized with at least one rivet connection and/or soldered connection and/or welded connection. These measures facilitate the installation of the control unit on the component carrier.

According to an exemplary embodiment, an electrical input connection is provided on the housing. With the input connection, the control electronic can be electrically connected to a vehicle field bus in a data-transmitting manner and electrically to an electric voltage supply of the motor vehicle. In this embodiment, the input connection can be electrically connected to the vehicle field bus and the electric voltage supply of the motor vehicle via an input plug connection arranged on the housing. This measure facilitates the electrical wiring up to ensuring an electrical connection from the control unit to the vehicle field bus of the vehicle or to the electric voltage supply of the same.

According to an advantageous further development, the input plug connection comprises an input plug receptacle fastened to the housing. An input plug formed complementarily to the input plug receptacle with electrical connection lines to the electric voltage supply or to the vehicle field bus can be plugged into or is plugged into this input plug receptacle. This measure also facilitates the assembly of the module from the function components, the control unit and the component carrier.

According to an advantageous further development, the control unit includes at least one electrical voltage supply line electrically connected to the control electronic system for supplying the control electronic system with electric energy. In this further development, the at least one electrical voltage supply line is electrically connected to the input connection arranged on the housing for electrically connecting to the electric voltage supply of the motor vehicle and to a supply output connection likewise arranged on the housing for electrically connecting and supplying at least one function component, typically at least two, particularly typically all of the function components with electric energy. In this way, the electric voltage supply of the motor vehicle can be used both for the electric energy supply of the control unit and also of the function components controlled by the control unit. An elaborate separate electrical wiring for connecting the individual function components directly to the electric voltage supply of the motor vehicle can be omitted in this way.

Particularly typically, an electrical control output connection can be provided on the housing. With this control output connection, at least one, typically multiple, particular typically all of the electrical control line paths and also of the component field bus can be electrically connected to the control electronic system. With this measure, electrical line distances between the control unit and the function components controlled by the control unit can also be kept short as a result of which the requirement of installation space is further reduced, and material costs are saved.

Practically, the electrical control output connection and the supply output connection can be electrically connected or are electrically connected to an output plug receptacle and to an output plug complementary thereto by way of a common output plug connection arranged on the control housing. This measure simplifies the assembly of the module and also facilitates the electrical wiring. In addition to this, the use of a common connector for voltage supply and signal transmission reduces the need for installation space on the housing for the connection of the corresponding control and signal and/or sensor lines respectively.

Alternatively or additionally, it is also conceivable with this version that the electrical control output connection can be electrically connected or are electrically connected to the function components via two output plug connections separately formed and arranged on the control housing, each with a separate plug receptacle and with a separate output plug each complementarily thereto. With respect to using different plug connections or connectors and plug receptacles complementary thereto, the control unit can thus be particularly flexibly adapted to different designs of the thermal management module.

According to an advantageous further development, the at least one voltage supply line can include a first electrical voltage supply line and a second voltage supply line designed for transmitting different electrical outputs. It is conceivable for example to design the first voltage supply line for transmitting electrical outputs up to a maximum of 1 kW, so that these are suitable for the electric energy supply of the function carriers formed by pumps. By contrast, significantly less electrical output is needed for adjusting electrically operated valves. It is therefore conceivable to design the second electric voltage supply for transmitting outputs up to a maximum of 10 W. In versions, other maximum values are also conceivable.

With the solution proposed here, the voltage supply lines can each be routed from the function component through the housing of the control unit and thus connected to the electric voltage supply of the motor vehicle via the input connection of the control unit. Here it is conceivable that the electrical and electronic components of the control electronic system are also connected to the electrical voltage supply line in order to be supplied with an electrical supply voltage in this way.

Advantageously, at least one function component can be formed by an expansion tank for collecting cooling liquid that can be connected into the cooling circuit. Advantageously, the at least one function component can be formed by a pump that can be connected into the cooling circuit. Advantageously, the at least one function component can be formed by a chiller that can be connected into the cooling circuit. Advantageously, the at least one function component can be formed by a heat exchanger that can be connected into the cooling circuit. Advantageously, the at least one function component can be formed by a valve that can be connected into the cooling circuit. Advantageously, the at least one function component can be formed by a filter that can be connected into the cooling circuit. Advantageously, the at least one function component can be formed by an indirect condenser that can be connected into the cooling circuit. Advantageously, the at least one function component can also be formed by another component that can be connected into the cooling circuit.

Further, the disclosure relates to a motor vehicle having an internal combustion engine and/or having an electric drive. Thus, the motor vehicle can be a vehicle that is exclusively driven by an internal combustion engine. However, the motor vehicle can also be a hybrid or electric vehicle. Further, the motor vehicle according to the disclosure includes a temperature-control circuit for temperature-controlling at least one component of the motor vehicle, in particular an electrical battery and/or a battery-electric drive of the motor vehicle, wherein the temperature-control circuit comprises a thermal management module according to the disclosure explained above. The advantages of the thermal management module according to the disclosure explained above therefore apply also to the motor vehicle according to the disclosure.

Further, the disclosure relates to a method for operating the thermal management module according to the disclosure introduced above. Accordingly, the basic idea of the method according to the disclosure is to configure a control unit for controlling the function components of a thermal management module so as to be operable in two different operating modes and so as to be switchable between these. In a first operating mode, control commands received from a vehicle field bus are not evaluated by the control unit or its control electronic system, but for controlling the function components concerned, passed on directly to a component field bus to which the function components are connected. This allows controlling the function components directly from the vehicle field bus. When for vehicle field bus different bus systems are used—for example a CAN bus as vehicle field bus and a LIN bus as component field bus, the control unit can quasi "translate" the control commands received from the vehicle field bus or CAN bus so that these can be further processed on the component field bus or LIN bus. In terms of content however, the commands received from the vehicle field bus in the first operating mode remain unchanged when passed on to the component field bus by the control unit.

Compared with this, control commands received from the vehicle field bus are not "looped through", i.e., passed on in an unprocessed manner by the control unit unlike in the first operating mode, but processed by the control electronic system of the control unit. During the course of this processing of the higher-level commands received from the vehicle field bus, corresponding individual commands can be sent to the function components by the control unit via the component field bus. In this way, the thermal management module can be largely operated independently. Unlike in the first operating mode, it is in particular no longer necessary to send so-called "low level" commands from the vehicle field bus directly and in an unprocessed manner to the function components, but it is rather sufficient to only send higher-level commands to the control unit which for example activate or change a specific function mode of the thermal management module or one or multiple of its function components, which can relate in particular on the interaction of multiple function components. The individual control of the function components required for implementing such a function mode in the second operating mode is taken over by the control unit. Such a "modular" control of the function components simplifies the controlling of the thermal management module via the vehicle field bus. Apart from this, the thermal management module can be controlled with a high flexibility by providing the two operating states explained above.

With the method according to the disclosure a thermal management module according to the disclosure is controlled. The same includes a component carrier and at least two, preferentially multiple electrically controllable function components for temperature-controlling at least one vehicle component of a motor vehicle, which are typically detachably or permanently connected to the component carrier. Further, the module includes at least one electrical control unit which for electrically controlling at least two, typically multiple, particularly typically all of the function components comprise a control electronic system, which via a component field bus is electrically connected to the respective function component and arranged in a housing of the control unit. Here, the control electronic system is connected to a vehicle field bus of the motor vehicle equipped with the thermal management module electrically and in a data-transmitting manner. According to the disclosure, the control unit of the module can be switched between a first and at least one second operating mode. In the first operating mode, control commands received from the vehicle field bus are directly passed on to the component field bus by the control electronic system for controlling the function component concerned and thereby remain unchanged at least in terms of content. Compared with this, control commands received from the vehicle field bus in the second operating mode are initially processed as so-called higher-level control commands by the control electronic system which means that the individual control of the function components concerned is carried out by the control unit.

According to an exemplary embodiment of the method, the control unit, in the at least one second operating mode, controls at least one function component, typically multiple function components as reaction to at least one higher-level control command received from the vehicle field bus. Thus, it is not necessary to transmit a multiplicity of individual commands to the respective function component. The detailed controlling of the function component concerned can rather take place via the control unit or from the same. Thus, higher-level control commands which can activate or change or deactivate a higher-level function command of the thermal management module, can be transmitted from the vehicle field bus to the control unit where they are processed for the individual control of the individual function components. Depending on the series of the thermal management module, the individual control of the function components installed in the thermal management module can thus be individually adapted. Compared with this, higher-level commands that are transmitted to the control unit via the vehicle field bus can also be uniformly used for different series. This simplifies controlling different series of the thermal management module which can differ from one another in particular in the composition or the individual control of individual function components since the individual composition of the thermal management module of different function components can remain disregarded when generating and sending a higher-level control command to the control unit.

Particularly typically, no commands provided by the vehicle field bus are processed by the function components in the at least one second operating mode. This supports the multi-step approach explained above, in which the function components do not require a direct communication connection to the vehicle field bus.

Particularly practically, the control unit in the first operating mode also activates those function components which are not connected to the component field bus. Thus, it is avoided that those function components which are not connected to the component field bus have to remain disregarded with respect to their control in the first operating mode.

According to an advantageous further development, the control unit is equipped/programmed in the at least one second operating state for carrying out at least one function mode, preferentially two or multiple function modes of the thermal management module. In this further development, the control of the at least one, preferentially multiple function component(s) in the at least one function mode takes place independently of the vehicle field bus. Typically, the control can take place according to a predetermined control strategy or closed-loop control strategy assigned to the respective function mode. According to such a control strategy or closed-loop control strategy, two or more function components can also be controlled. Obviously, two or more such control strategies or closed-loop control strategies can also be assigned to a respective function mode.

According to a further advantageous further development, at least one closed control loop with at least one closed-loop control variable and with at least one actuating variable that is adjustable in a function component can be carried out by the control unit in the at least one function mode. In this further development, a set-point value of the at least one closed-loop control variable can be additionally provided as higher-level control command from the vehicle field bus to the control unit and controlled by the control unit for adjusting the actuating variable of the respective function component. Because of this, the closed-loop control of the said function component(s) can be carried out independently with the help of the control unit, in which a corresponding closed-loop control algorithm can be integrated by software. In particular, no monitoring of the closed-loop control algorithm via the vehicle field bus is required. By contrast, higher-level commands which can generally relate to implementing the control loop can be received via the vehicle field bus. The already mentioned variation of a specific closed-loop control variable also counts among these.

According to an advantageous further development, the control unit can be switched into a third operating state. In this further development, the setting of the at least one function mode, in particular the switching from a set function mode into another function mode, takes place in the second operating mode with an higher-level control command received by the control unit from the vehicle field bus. In the third operating mode, the setting of the at least one function mode, in particular the switching from a set function mode into another function mode, is carried out automatically by the control unit, in particular without receiving a corresponding higher-level control command from the vehicle field bus. Thus, the third operating mode, compared with the second operating mode, allows an operation of the thermal management module with increased independency.

According to another exemplary embodiment, the control of the function components in the at least one second operating mode, in particular in the second or third operating mode includes the reception and the evaluation of sensor signals of at least one of the function components by the control unit.

Further important features and advantages of the disclosure are obtained from the drawings and from the associated figure description by way of the drawings.

It is to be understood that the features mentioned above and still to be explained in the following cannot only be used in the respective combinations stated, but also in other combinations or by themselves without leaving the scope of the present disclosure.

BRIEF DESCRIPTION OF THE DRAWINGS

The disclosure will now be described with reference to the drawings wherein.

DESCRIPTION OF EXEMPLARY EMBODIMENTS

Figure 1:
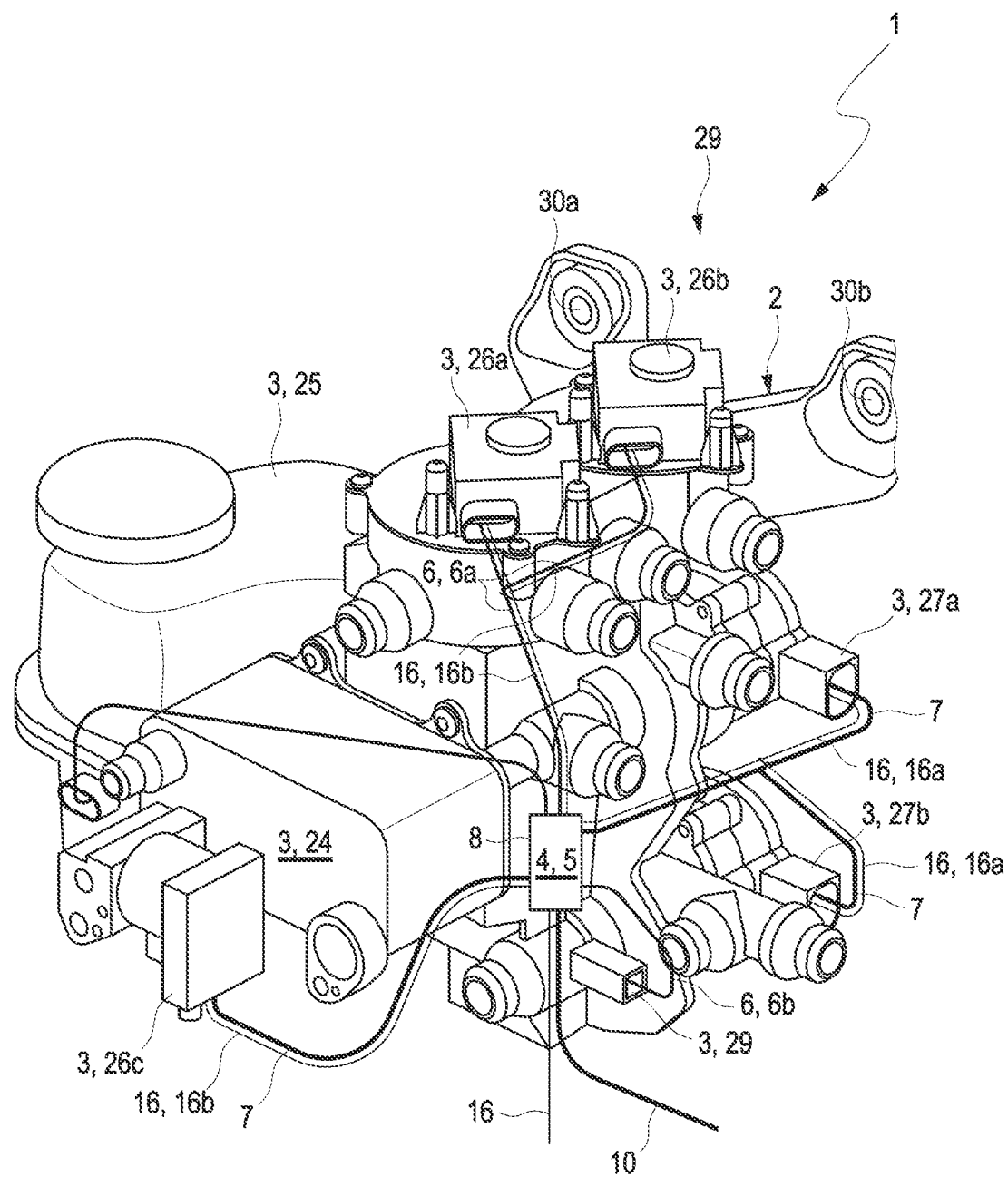
FIG. 1 shows an example of the thermal management module for a motor vehicle according to an exemplary embodiment of the disclosure.

Exemplary embodiments of the disclosure are shown in the drawings and are explained in more detail in the following description, wherein same reference numbers relate to same or similar or functionally same components.

Figure 2:
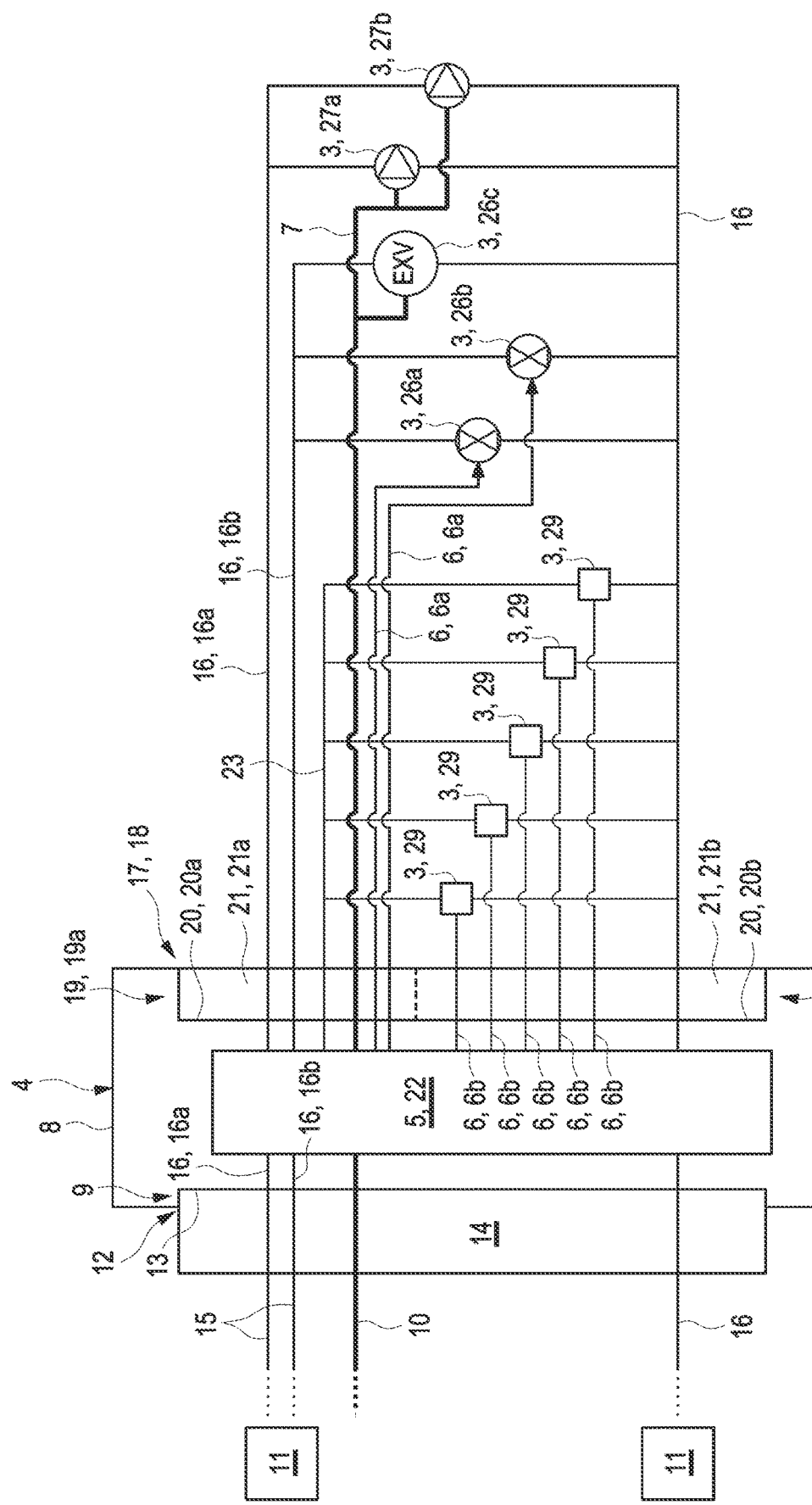
FIG. 2 shows, in a circuit diagram-like representation, a possible electrical wiring of the module of FIG. 1.

FIG. 1 exemplarily shows in a perspective view a thermal management module 1 according to the disclosure for a motor vehicle, in particular having an electric drive motor and having an electric energy store. The vehicle can be for example a purely battery-electrically driven vehicle or a fuel cell vehicle or a hybrid vehicle. FIG. 2 shows in a circuit diagram-like representation a possible electrical wiring of the module 1 of FIG. 1.

According to the FIGS. 1 and 2, the module 1 comprises a component carrier 2 and multiple electrically controllable function components 3. In this exemplary embodiment, the function components 3 are a chiller 24, an expansion tank 25, three valves 26*a*, 26*b*, 26*c*—wherein the two valves 26*a*, 26*b* are each a solenoid valve and the valve 26*c* an expansion valve—and two pumps 27*a* and 27*b*. The function components 3 of the module 1 and if applicable further components are fluidically connected to one another as part of a cooling circuit which is not shown further. Further function components 3 can be temperature sensors 29, for example for measuring the temperature of another function component 3, of which in FIG. 1 only two temperature sensors 29 are shown for the sake of clarity.

The component carrier 2 is designed for carrying the function components 3 and comprises for the respective function component 3 a suitable mechanical component interface. The respective component interface can be adapted to the respective shape and the size and the function of the respective function component 3. A respective function component 3 is then detachably fastened to the component carrier 2 via the respective component interface. However, a permanent, i.e., non-detachable fastening is also conceivable. On the component carrier 2, a fastening interface can be additionally molded via which the component carrier 2 and thereby the module 1 can be fastened to a body of the vehicle. In the exemplary embodiment, the fastening interface is formed by two openings 30*a* and 30*b*.

According to FIG. 1, the module 1, further, includes a schematically shown control unit 4, which for electrically controlling the function components 3 comprises a control electronic system 5 (only indicated roughly schematically in FIG. 1) with electrical and electronic components and is arranged in a housing 8 of the control unit 4. The housing 8 of the control unit 4 can also be detachably or non-detachably fastened to the component carrier 2. A detachable fastening of the housing 8 can be realized for example with a screw connection, clip connection or snap-on connection. A non-detachable fastening of the housing 8 can be realized for example with a rivet connection, soldered connection or welded connection.

In the following, reference is made to the circuit diagram-like representation of FIG. 2. Accordingly, the control electronic system 5 can be arranged on a board 22 present in the housing 8 or include such a board 22. Further, the control electronic system 5 can be electrically connected to the respective function component 3 via electrical control line paths 6 and via a component field bus 7—typically via a LIN Bus. The control line paths 6 can be electrical control lines 6*a* which serve for controlling the respective function component 3. By way of the control lines 6*a*, control signals can be transmitted to a respective function component 3. However, the control line paths 6 can also be sensor or signal lines 6*b*, via which sensor signals can be transmitted from the respective function component 3—for example from the temperature sensors 29—to the control unit 4 or control electronic system 5. By way of the component field bus 7, a control of this function component 3 can likewise take place through unidirectional or bi-directional data transmission between the respective function component 3 and the control unit 4 or the control electronic system 5.

In the exemplary scenario of FIG. 2, the two valves 26*a*, 26*b* are controlled via the control lines 6*a*, whereas the expansion valve 26*c* is connected to the component field bus 7 and is consequently controlled from the control unit 4 via the component field bus 7. The two pumps 27*a*, 27*b* are also connected to the component field bus 7 in the example and are thus controlled from the control unit 4 via the component field bus 7.

According to the exemplary scenario in FIG. 2, an electrical input connection 9 is provided on the housing 8 of the control unit 4 with which the control electronic system 5 can be connected electrically and in a data-transmitting manner to a vehicle field bus 10—typically to a CAN bus—of the motor vehicle using the module 1 and electrically to an electric voltage supply 11 of this motor vehicle. The input connection 9 in turn can be electrically connected to the vehicle field bus 10 and the electric voltage supply 11 of the motor vehicle via an input plug connection 12 arranged on the housing 8. The said input plug connection 12 can include an input plug receptacle 13 fastened to the housing 8, into which an input plug 14 with electrical connection lines 15 to the electric voltage supply 11 or to the vehicle field bus 10 formed complementarily to the input plug receptacle 13 can be plugged.

Furthermore, the control unit 4 can include an electrical voltage supply line 16 electrically connected to the control electronic system 5 for supplying the control electronic system 5 and also the function components 3 with electric energy. To this end, the electrical voltage supply line 16 can be electrically routed to the input connection 9 and to a supply output connection 17 likewise arranged on the housing 8, with which the voltage supply line 16 can be electrically connected, for the electric voltage supply, to at least one function component 3.

In the exemplary scenario, the voltage supply line 16 includes a first voltage supply line 16*a* and a second voltage supply line 16*b*, which are designed for transmitting different electrical outputs.

For example, the first electrical voltage supply line 16*a* can be designed for transmitting a maximum electrical output of up to 1 kW, whereas the second electrical voltage supply line 16*b* can be designed for transmitting only a maximum electrical output of a few watts. Optionally, an electrical low-voltage—in particular of 5 volt or 12 volt—can be directly provided by the control electronic system 5 or board 22 to different component carriers 3 with very low electrical power consumption—in the exemplary scenario these are the temperature sensors 29. To this end, electrical low-voltage lines 23 running from the control electronic system 5 or from the board 22 to the function components 3 concerned can be provided.

In addition, an electrical control output connection 18 is provided on the housing 8, with which all of the electrical control line paths 6 and the component field bus 7 can be electrically connected to the control electronic system 5.

According to FIG. 2, the electrical control output connection 18 and the supply output connection 17 are electrically connected to the function components 3 via a common output plug connection 19 with an output plug receptacle 20 and with an output plug 21 complementary thereto.

In a version that is not shown, the electrical control output connection 18 and the supply output connection 17 can be electrically connected to the function components 3 via two output plug connections 19*a*, 19*b* formed separately and arranged on the housing 8, each with a separate plug receptacle 20*a*, 20*b* and with a separate output plug 21*a*, 21*b* each complementary thereto. The abovementioned electrical low-voltage line 23 can also be integrated in the supply output connection 17.

Figure 3:
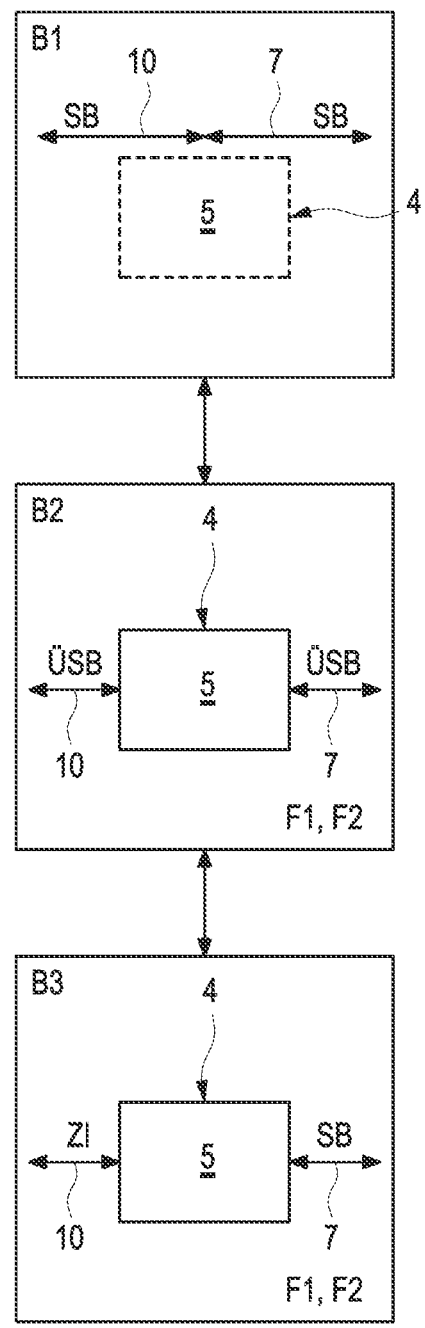
FIG. 3 shows a diagram-like representation illustrating the different possible operating modes of the thermal management module.

In the following, reference is made to the diagram according to FIG. 3. As illustrated by the representation of FIG. 3, the control unit 5 can be switched between a first, second and third operating mode B1, B2, B3. In the first operating mode B1, control commands SB received from the vehicle field bus 10—in the example a CAN bus 10—are not changed by the control electronic system 5, but for controlling the function component 3 concerned, are directly passed on to the component field bus 7—in the example a LIN bus. By contrast, control commands SB received from the vehicle field bus 10 in the second operating mode B2 are processed as higher-level control commands USB by the control electronic system 5. This means that the controlling of the function component 3 compared with the vehicle field bus 10 is carried out independently by the control unit 5. If for vehicle field bus 10 different bus systems are used—for example a CAN bus as vehicle field bus and a LIN bus as component field bus, the control unit 5 can quasi "translate" the control commands received from the vehicle field bus 10 and CAN bus respectively, so that these are further processed on the component field bus 7 or LIN bus. In terms of content, the commands received from the vehicle field bus 10 in the first operating mode however remain unchanged.

Compared to this, no control commands provided by the vehicle field bus 10 are directly processed by the function components 3 in the second operating mode B2—and also in the third operating mode B3. The control unit 4 rather controls function components 3 in the second operating mode B2 and also in the third operating mode B3 as reaction to higher-level control commands USB received from the vehicle field bus 10. To this end, corresponding control commands SB are transmitted to the function components 3 by the control unit 4 via the component field bus 7.

Furthermore, the control unit 4 can be equipped or programmed in the second operating state B2 and also in the third operating state B3 for carrying out two or more function modes F1, F2 of the thermal management module 1. In the respective function mode F1, F2, the control of the function components 3 takes place according to a predetermined control strategy assigned to the at least one function mode F1, F2.

For example, a closed control loop with a closed-loop control variable and with an actuating variable that is adjustable in a function component 3 can be carried out by the control unit 4 in a function mode F1. Here, a set-point value of the closed-loop control variable as higher-level control command USB can be provided by the vehicle field bus 10 to the control unit 4 so that for adjusting the actuating variable the function component 3 can be activated from the control unit 4 with suitable control commands SB.

In the example of FIG. 3, the control unit 4, further, can be switched into a third operating state B3. In the second operating mode B2, the setting of a specific function mode F1, F2 or the switching of the currently set function mode F1, F2 into another function mode 3 takes place as reaction to a higher-level control command USB received by the control unit 4 from the vehicle field bus 10. Compared with this, the control unit 4 automatically assumes in the third operating mode B3 both the setting of a specific function mode F1, F2 and also the switching between two function modes F1, F2 without a corresponding higher-level control command USB having to be received from the vehicle field bus 10 for this purpose. Instead, additional information ZI, which is provided to the control unit 4 via the vehicle field bus 10 are processed by the control unit 4.

Both in the second operating mode B2 and also in the third operating mode B3 the control of the function components 3 can include receiving and evaluating sensor signals from at least one of the function components 3 by the control unit 4, provided these sensor signals are not transmitted to the control unit 4 via the component field bus 7, but only via the control line paths 6.

It is understood that the foregoing description is that of the exemplary embodiments of the disclosure and that various changes and modifications may be made thereto without departing from the spirit and scope of the disclosure as defined in the appended claims.

What is claimed is:

1. A thermal management module for a temperature-control circuit of a motor vehicle, the thermal management module comprising:
   a component carrier;
   at least two electrically controllable function components configured to temperature-control at least one vehicle component of a motor vehicle, wherein the at least two electrically controllable function components are detachably or non-detachably connected to the component carrier; and
   an electrical control unit including an electrononic control system and being configured to control each of the at least two electrically controllable function components, the electrical control unit being electrically connected to each of the at least two electrically controllable function components via at least one of an electrical control line path and a component field bus
   wherein the electrical control unit is configured to:
      switch between a first and at least one second operating mode;
      in the first operating mode, pass on control commands received from the vehicle field bus unchanged at least in content to the component field bus by the electronic control system to control at least one of the at least two electrically controllable function components; and
      in the at least one second operating mode, process control commands received from the vehicle field bus by the control electronic system such that the controlling of the at least two electrically controllable function components is carried out by the control unit,
   wherein the electrical control unit is arranged in a housing of the control unit, and
   wherein the housing of the control unit is detachably or non-detachably fastened to at least one of the component carrier and at least one of the electrically controllable function components.

2. The thermal management module according to claim 1, wherein the housing is detachably fastened with at least one of a screw connection, a clip connection, and a snap-on connection.

3. The thermal management module according to claim 1, wherein:
   the housing includes an electrical input connection,
   the electronic control system, including the component field bus, can be connected to a vehicle field bus and to an electric voltage supply of the motor vehicle electrically or in a data-transmitting manner via the electrical input connection, and
   the electrical input connection can be electrically connected via an input plug connection to the vehicle field bus and the electric voltage supply of the motor vehicle.

4. The thermal management module according to claim 3, wherein the input plug connection includes an input plug receptacle fastened to the housing, into which an input plug with electrical connection lines to the electric voltage supply or to the vehicle field bus formed complementarily to the input plug receptacle, can be plugged.

5. The thermal management module according to claim 1, wherein:
   the control unit includes at least one electrical voltage supply line electrically connected to the electronic control system for supplying the electronic control system with electric energy, and
   the at least one electrical voltage supply line is electrically routed to the input connection arranged on the housing and is additionally routed to a supply output connection likewise arranged on the housing, with which the voltage supply line for the electric voltage supply is electrically connected to at least one electrically controllable function component.

6. The thermal management module according to claim 5, wherein:
the at least one voltage supply line includes a first voltage supply line and a second voltage supply line, and
the first voltage supply line and the second voltage supply line are configured to transmit different electrical outputs.

7. The thermal management module according to claim 1, wherein:
the housing includes an electrical control output connection, and
at least one of (a) at least one electrical control line path, (b) multiple electrical control line paths, and (c) all of the electrical control line paths and the component field bus can be electrically connected to the control electronic system via the electrical control output connection.

8. The thermal management module according to claim 7, wherein:
the electrical control output connection and the supply output connection can be electrically connected or are electrically connected to the at least two electrically controllable function components via a common output plug connection arranged on the control housing with an output plug receptacle and with an output plug complementary to the output plug receptacle, or
the electrical control output connection and the supply output connection can be electrically connected or are electrically connected to the at least two electrically controllable function components via two output plug connections formed separately and arranged on the control housing each with a separate plug receptacle and with a separate output plug each complementary the separate plug receptacle.

9. The thermal management module according to claim 1, wherein the module comprises at least one electrically controllable function component of a cooling circuit of the vehicle that can be flowed through by cooling liquid and a component carrier.

10. The thermal management module according to claim 1, wherein:
at least one electrically controllable function component is formed by an expansion tank that can be connected to a cooling circuit for collecting cooling liquid, and/or
the at least one electrically controllable function component is formed by a pump that can be connected into the cooling circuit, and/or
the at least one electrically controllable function component is formed by a chiller that can be connected into the cooling circuit, and/or
the at least one electrically controllable function component is formed by a heat exchanger that can be connected into the cooling circuit, and/or
the at least one electrically controllable function component is formed by a valve that can be connected into the cooling circuit, and/or
the at least one electrically controllable function component is formed by a filter that can be connected into the cooling circuit, and/or
the at least one electrically controllable function component is formed by an indirect condenser that can be connected into the cooling circuit.

11. A motor vehicle, comprising:
an internal combustion engine and/or an electric drive; and
a temperature-control circuit for temperature-controlling at least one component of the motor vehicle, and
wherein the temperature-control circuit comprises a thermal management module according to claim 1.

12. The motor vehicle according to claim 11, wherein the at least one component of the motor vehicle is an electrical battery of the motor vehicle.

13. The motor vehicle according to claim 11, wherein the at least one component of the motor vehicle is a battery-electric drive of the motor vehicle.

14. A method for operating the thermal management module according to claim 1, the method comprising:
switching the control unit between a first and at least one second operating mode;
in the first operating mode, passing on control commands received from the vehicle field bus unchanged at least in content to the component field bus by the control electronic control system to control at least one of the at least two electrically controllable function components; and
in the at least one second operating mode, processing control commands received from the vehicle field bus by the control electronic system such that the controlling of the at least two electrically controllable function components is carried out by the control unit.

15. The method according to claim 14, wherein in at least one second operating mode the control unit controls at least one electrically controllable function component or the at least two electrically controllable function components, in response to at least one higher-level control command received from the vehicle field bus via the component field bus or via an electrical control line, via which the at least one electrically controllable function component is or the at least two electrically controllable function components are connected to the control device.

16. The method according to claim 14, wherein in at least one second operating mode, no control commands provided by the vehicle field bus are directly passed on from the function components via the component field bus to a function component.

17. The thermal management module according to claim 1, wherein the housing is the non-detachably fastened with at least one of a rivet connection, a soldered connection, and a welded connection.

* * * * *